J. J. DITTENHOEFER.
PNEUMATIC VEHICLE TIRE.
APPLICATION FILED SEPT. 2, 1913.
1,089,913.  Patented Mar. 10, 1914.
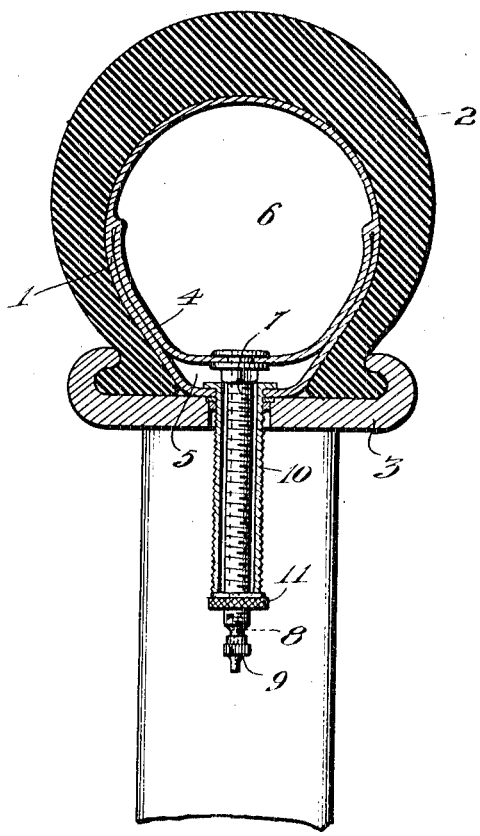
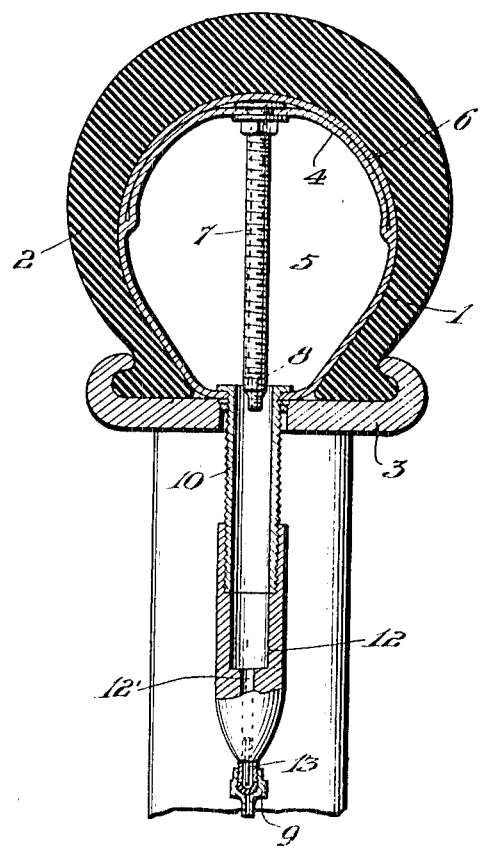

UNITED STATES PATENT OFFICE.

JEROME J. DITTENHOEFER, OF CHICAGO, ILLINOIS.

PNEUMATIC VEHICLE-TIRE.

1,089,913.   Specification of Letters Patent.   Patented Mar. 10, 1914.

Application filed September 2, 1913. Serial No. 787,722.

*To all whom it may concern:*

Be it known that I, JEROME J. DITTENHOEFER, a citizen of the United States, and a resident of the city of Chicago, county of Cook, and State of Illinois, have invented certain new and useful Improvements in Pneumatic Vehicle-Tires, of which the following is a specification.

My invention relates to improvements in pneumatic vehicle tires and has for its object the production of a tire provided with a plurality of independent air compartments whereby in the event of the puncture of one of said compartments the other compartment may be utilized so as to obviate the necessity of immediate repair of the punctured tire before the same may again be utilized.

A further object is the production of a vehicle tire as mentioned which will be of simple construction and efficient in use.

Other objects will appear hereinafter.

The invention consists in the combinations and arrangements of parts hereinafter described and claimed.

The invention will be best understood by reference to the accompanying drawing forming a part of this specification and in which—

Figure 1 is a cross section of a vehicle tire embodying my invention, one of the air compartments of the tire being shown utilized in this figure, and Fig. 2 is a section similar to Fig. 1 showing the other air compartment of the tire being used.

The preferred form of construction as illustrated in the drawing comprises an air tube 1 formed of flexible material such as rubber which is arranged in a conventional tire casing 2 mounted in a clencher rim 3. The interior of tube 1 is divided by a longitudinally extending medial partition 4 into coextensive independent inner and outer compartments 5 and 6 which extend completely around the tire as will be readily understood. The partition 4 is of a width equal to substantially one-half of the circumference of the tube 1 so as to adapt the same to lie flat against the inner or outer portions of the tube 1 as shown in Figs. 1 and 2 respectively. Communicating with the compartment 6 is an air inlet tube 7 the inner end of which is connected as shown with the partition 4, the outer end of said tube 7 projecting exteriorly and being equipped with the conventional air governing or puppet valve 8 and screw cap 9. Communicating with the compartment 5 is an air inlet tube 10 connected at its inner end with the inner wall of tube 1 as shown. The tube 10 also projects exteriorly, the tube 7 extending loosely therethrough so as to form an annular air passage between the adjacent walls of said tubes as clearly shown in Fig. 1.

In using the tire the outer compartment 6 is first utilized in which event the air inlet tube 7 will assume the position shown in Fig. 1 or at its outer terminal of movement in tube 10. Said tube 7 is held, in this case, against relative movement in tube 10 by means of a collar 11 threaded upon the outer end of tube 7 which engages against the corresponding end of tube 10 as shown in Fig. 1. Inflation of the tire is of course effected by attachment of a pump or air supply to the outer end of tube 7, the cap 9 being removed for this purpose as will be readily understood.

In the event of a puncture to the outer wall of tube 1 or of compartment 6 the collar 11 is removed from tube 7 in order to release the latter and permit of the partition 4 being flexed outwardly to the position shown in Fig. 2 so as to permit of utilization of compartment 5. In utilizing compartment 5 a cap 12 is threaded upon the outer end of tube 10. Said cap 12 is provided with an axial air passage therethrough which is controlled by a valve 13 of the same character as valve 8. The outer end of cap 12 is formed to correspond with the outer end of tube 7 so that inflation of the compartment 5, after the arrangement of cap 12 as shown, may be effected by simply attaching said end of said cap to a pump or source of air supply. The cap 9, after inflation of the compartment 5 may be arranged over the outer end of cap 12 as shown in Fig. 2. The cap 12 which is arranged over the outer end of tube 10 when the second or inner air compartment is being used is so formed as to afford clearance for the outer end of tube 7 in order to permit of free movement of the latter longitudinally of tube 10 as will be the case when the vehicle is running and the tire is compressed. Also the tube 7 is of such a length that, when the partition 4 is in outwardly flexed position, the outer end of said tube will project slightly into the inner end of the tube 10, in order to insure against nonregistration of the tube 7 with the tube 10 during the compression of the tire; it being understood that freedom of movement of the tube 7 in tube 10 must be insured in order to secure freedom of compression of the tire when in use. With this arrangement it will be seen that two air compartments instead of one, as is usual, are provided in the air tube of the tires so that in the event of the puncture of one of said compartments the other may be utilized thereby obviating the necessity of stopping to repair the puncture before the tire may again be used.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A pneumatic vehicle tire comprising an air tube divided longitudinally by a flexible partition into inner and outer co-extensive independent compartments; a valved air inlet tube communicating with said outer compartment, said tube being connected at its inner end with said partition and passing exteriorly loosely through the inner wall of said air tube; a second tube communicating with said inner compartment and being connected at its inner end with the inner wall of said air tube, said second tube loosely surrounding said first tube so as to form an annular air passage through said second tube around said first tube and permit of free longitudinal movement of the latter in said second tube, said first tube being of such a length that, when said partition is in outwardly flexed position, the outer end of said tube will project slightly into the inner end of said second tube; and an elongated valved cap adapted for arrangement over the outer end of said second tube, said cap having a medial passage therein registering with the passage through said second tube, the inner end of said passage through said cap being enlarged, said enlarged portion of said passage being of such a length and width as to permit of free longitudinal movement of said first mentioned tube thereinto without the outer end of said tube striking the inner end of said enlarged portion, when the tire is compressed and with the inner compartment in use, substantially as described.

In testimony whereof I have signed my name to this specification in the presence of two subscribing witnesses.

JEROME J. DITTENHOEFER.

Witnesses:
B. G. RICHARDS,
HELEN F. LILLIS.